Dec. 7, 1926.  
B. J. HUBBARD  
1,609,409  
VEHICLE VENTILATOR  
Filed April 2, 1924   2 Sheets-Sheet 1
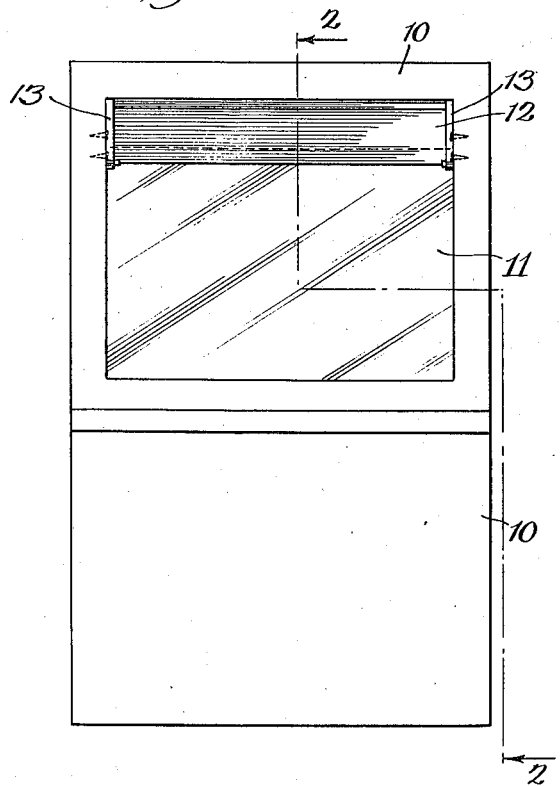
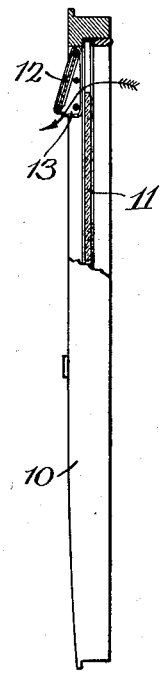
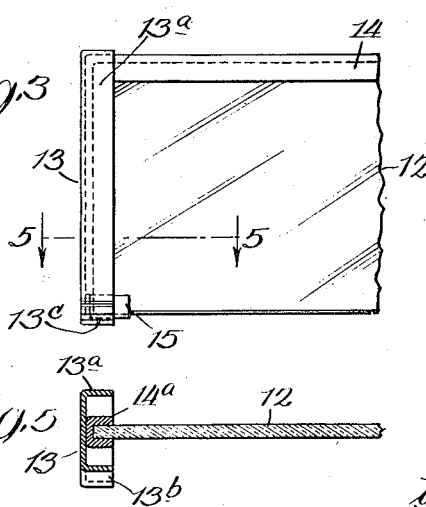
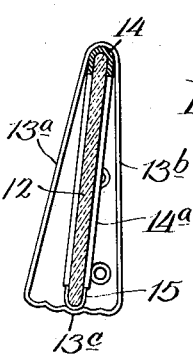
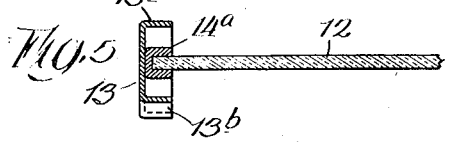
Inventor:  
Burtt J. Hubbard  
by George Bayard Jones  
Atty.

Dec. 7, 1926.   B. J. HUBBARD   1,609,409
VEHICLE VENTILATOR
Filed April 2, 1924   2 Sheets-Sheet 2
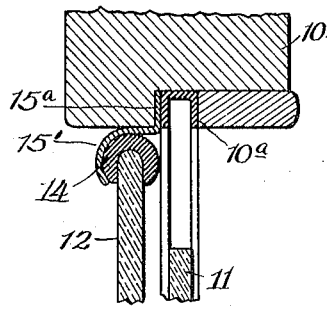
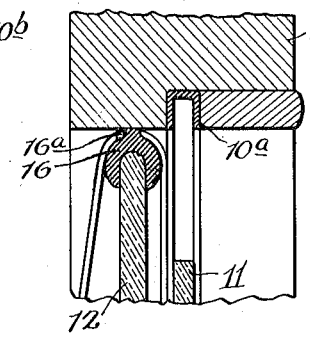
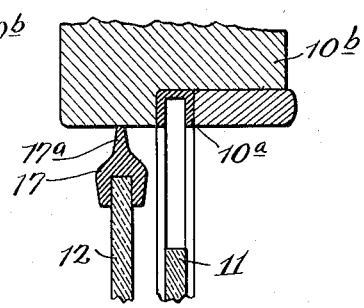
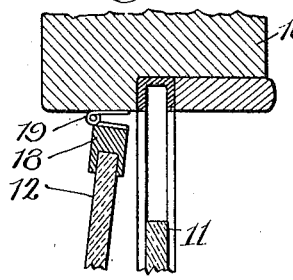
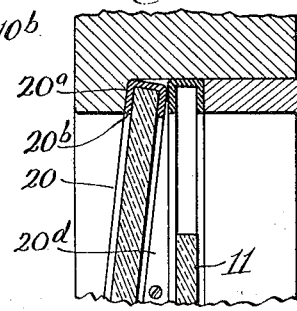
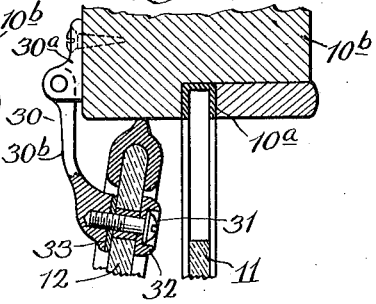
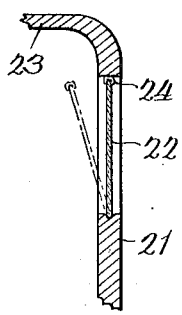
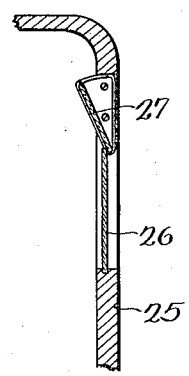
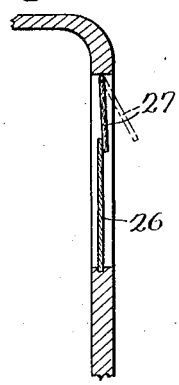

Patented Dec. 7, 1926.

1,609,409

UNITED STATES PATENT OFFICE.

BURTT J. HUBBARD, OF KOKOMO, INDIANA.

VEHICLE VENTILATOR.

Application filed April 2, 1924. Serial No. 703,599.

This invention relates to improvements in vehicle ventilators.

An object of the invention is to provide a ventilator which may be applied to a closed vehicle, such as an automobile, passenger car or the like, which will prevent the entrance of rain, snow or other foreign matter through a window in the door or other portion of the vehicle body when said window is opened for purposes of ventilation.

A further object is to provide a ventilator which may be applied to the side of a vehicle and which will function also as a sunshade or visor.

Another object is to provide such a ventilator which may be adjusted in various positions to regulate the ventilation of the vehicle with which it is used.

Another object relates to various features of arrangement and construction which will be apparent from a consideration of the following specification considered in connection with the accompanying drawings wherein—

Figure 1 is a front elevation of a portion of a vehicle body comprising a window, Fig. 2 is a sectional elevation taken on line 2—2 of Fig. 1, Fig. 3 is an enlarged fragmentary view of one end of the ventilator and supporting bracket, Fig. 4 is an enlarged sectional view thereof, Fig. 5 is a sectional view taken on line 5—5 of Fig. 3, and Figs. 6 to 14 inclusive, are modifications of my invention.

In the drawings similar reference characters have been used to designate like elements in the several views.

In the drawings 10 indicates generally, a portion or panel of the side of a vehicle, such as an enclosed automobile or other passenger conveyance, which has a window 11 therein provided in any conventional manner for being lowered from the top to permit of ventilating the interior of the vehicle. This panel or section may be a door of a closed automobile.

Pivotally mounted in the top of the window opening in section 10 is ventilator 12 of glass, which may be plain or colored, or said ventilator may be of other material, as desired. The ventilator 12 is pivotally mounted in brackets 13 which are secured to the upper inner portions of a window frame as shown clearly in Figures 1 and 2, as by screws or the like. Each bracket 13 comprises flanges 13$^a$ and 13$^b$, the latter of which is preferably mounted in a plane parallel with that of the window 11. Flanges 13$^a$ and 13$^b$ are joined at the bottom by a corrugated flange 13$^c$, and converge at their upper portions forming a semi-circular casing as shown in Fig. 4 for the reception of the upper corners of the ventilator 12 as shown in Figs. 1 to 4 inclusive. The ventilator 12 is secured in position in the upper portion of the window opening by the said brackets 13, the ventilator being provided along its top edge with a rubber or other resilient weather strip 14, which is of channel shape as shown in Fig. 4 and is adapted to prevent the entrance of rain or snow between the top of the ventilator and the upper edge of the window opening. A similar weather strip is provided on each end of the ventilator as shown at 14$^a$ in Fig. 5.

The lower corner of the ventilator 12 is preferably provided with a metallic or other clip 15, securely attached thereto. This clip is attached to protect the lower corner of the glass ventilator from chipping or breaking in its movement on the corrugated flange 13. The corrugations of the flange 13$^c$ are adapted to secure the ventilator in a plurality of positions of adjustment with reference to the opening formed at the upper portion of the window when glass 11 thereof is lowered, as shown in Figs. 1 and 2, the said flange 13$^c$ being sufficiently resilient to permit of such movement of the ventilator.

It will be obvious that a person riding in a vehicle on which my ventilator is installed may lower the window or glass 11 by any convenient means, (not shown in the drawings) for purposes of ventilation, and that while open, rain, snow, cinders and other foreign particles, will be excluded by virtue of my ventilator.

In Fig. 6 I have shown a modification of my invention. 10$^b$ is a portion of the vehicle panel, door, or the like, having the window 11 which may be lowered for ventilation purposes as in the previously described modifications, the construction of the panel and the means for lowering or raising the window being of any preferred form. The ventilator 12 is provided at its top edge with the resilient weather strip 14 as in the other form, and is adapted to be held in position by a suitable bracket, such as that shown in Figs. 1 to 5 inclusive, but omitted from this view. A metal shield 15' having a contour adapted to closely fit the outer half of strip 14 and having an upwardly turned flange 15ª which is seated in the groove 10ª, is disposed between the brackets 13. The shield 15' may be secured, by any approved means to the rail portion 10ᵇ of panel 10. It will be seen that the curvature of the lower portion of the shield 15' being concentric with the strip 14 will permit of the pivotal movement of the ventilator 12, and that it will be impossible for rain, snow or dust, or other foreign matter, to pass between the upper portion of the ventilator 12 and the lower edge of the upper rail 10ᵇ of the window opening.

In Fig. 7 I have shown a ventilator comprising a weather strip 16 of slightly different form from those previously described, the remainder of the representation of said figure corresponding with that shown in Figs. 1 to 5 inclusive. The weather strip 16 in Fig. 7 is provided with a longitudinal rib 16ª which is in close contact with the lower edge of the top rail member 10ᵇ of the window opening. The material of which the strip 16 is composed is preferably resilient, such as rubber, and it will be seen therefore, that since the rib is slightly compressed while the ventilator is in closed position, as the ventilator is turned on its pivot to farthest open position, the rib 16ª will maintain close contact with the rail 10ᵇ to prevent the entrance of any foreign matter.

In Fig. 8 I have shown a further modification of the weather strip designated 17. This form of strip has an elongated flexible rib 17ª at its upper edge which is adapted to maintain close contact with the lower surface of the rail, the other features of the modification being similar to those shown in Figs. 1 to 5 inclusive, but omitted for the sake of simplicity.

In Fig. 9 I show a window 11 adapted to be raised or lowered as previously described and a ventilator 12 which is carried in the channeled supporting frame 18, which frame extends along the top of the ventilator and on each end thereof thereby enclosing the same on three sides. The frame 18 is provided with a hinge 19 which secures the ventilator to the lower surface of the rail 10ᵇ in the window opening. The hinge is preferably of the piano type and extends the entire length of the top portion of the channel frame 18 thereby preventing the entrance of rain or snow between said channel member and the rail 10ᵇ. The ventilator 12 shown in Fig. 9 may be held in adjusted position by means of brackets similar to those shown in Figs. 1 to 5.

In Fig. 10 I have shown a modification of my invention comprising the rail 10ᵇ and the window 11 adapted to be raised or lowered for ventilating purposes, and a ventilator 20. This ventilator 20 is mounted in a channel 20ª formed in the lower surface of the rail 10ᵇ and is provided with suitable weatherstripping 20ᵇ to make the same tight as shown. The ends of the ventilator may be similarly housed within the window casing. A wedge shaped jamb member 20ᵈ is positioned between the ventilator and the window as shown, for securing the former in place. This type of ventilator may be non-pivotally seated in the window opening by any other approved means, such as by brackets of any suitable type, as will be obvious.

In Fig. 11 I show a further modification of my invention said figure being a section through a window 22 of the rear of a vehicle, or the rear side window, 23 indicating a portion of the vehicle top. Window 22 is pivotally mounted at its lower edge for movement inwardly to the position shown by dotted lines, for instance, for ventilating purposes. The window 22 may be secured in its open position by any approved means, such as, for instance, the bracket 13 shown in Figs. 1 to 5, said brackets being inverted and the weather strip 24 being provided along the top edge of the glass, or other approved means employed for making the same tight while in closed position.

Fig. 12 is a sectional view of the side 25 of a vehicle in which is positioned a fixed or non-slidable window 26. A ventilator 27 is pivotally mounted at its lower edge at the outside of the upper edge of glass 26 as shown, and is adapted to be moved inwardly to permit of ventilation. The ventilator 27 may be held in open or closed position by any approved means such as the brackets previously shown and described.

Fig. 13 is a representation of a modification similar to that shown in Fig. 12, except that ventilator 27 is pivotally mounted at the top thereof and when in closed position the ventilator overhangs the upper edge of the window 26 as shown, said ventilator being adapted to be held in any position of adjustment by means of the brackets previously described, or modifications thereof.

In Fig. 14 I have shown a further modification comprising a ventilator 12 adjustably carried adjacent the upper portion of slidable window 11 by means of friction hinges designated generally by numeral 30. The hinges, one of which may be provided at either end of the ventilator, each comprises a portion 30ª adapted to receive screws, or the like, for securing the same to the vehicle body above the window opening and an arm 30<sup>b</sup> which is frictionally pivoted to portion 30<sup>a</sup>, the means for causing suitable friction between the said parts being fibre, or other washers (not shown) or any other approved means may be employed. Arm 30<sup>b</sup> at its lower end threadedly receives screw 31 passing through a hole in the ventilator 11 as shown, rubber gaskets 32 and 33 or other cushioning means being provided under the screw head and between the end of the arm 30<sup>b</sup> and the ventilator respectively.

The upper edge and the ends of the ventilator may be provided with a rubber weather strip, as shown, similar in form to that designated 16 in Fig. 7, although it need not necessarily be such shape as will be obvious. In this form of ventilator as in the forms previously described, the lower edge of the ventilator may be so shaped, or disposed at such an angle, as to accentuate the ventilating action thereof during the movement of the car or vehicle to which it is applied.

The weather-strips, above described, which enclose the upper edges of the glass ventilators and contact with the top portions of the window frames, being resilient, permit a substantially uniform contact of said strips with the window frames notwithstanding slight irregularities in the contacting surfaces of the latter, or variations in the contours of the upper corners of the window opening, or slight differences in the distance between the upper edge of the glass and the window frame. These strips therefore in cooperation with the strips which enclose the ends of the glass ventilators, provide resilient or cushioned mountings which protect the ventilators against breakage due to vibrations and stresses to which they are subjected in use.

As previously mentioned, the ventilator may be mounted for co-operation with the window in a door of a closed automobile, and since such doors are subjected to forces or stresses which tend to cause distortion or sagging of the same, resulting in a tendency to cramp the ventilator between the door stiles and top rail my resilient mounting flexes or gives sufficiently to permit a slight relative movement of the door and glass, and thus protects the glass against breaking under such conditions.

It will be apparent that my ventilator may be applied to a car in the factory in which it is made or may readily be applied to the car by the owner thereof. It will also be apparent that other forms of brackets or adjusting members may be devised for holding the ventilator in adjusted position and that weather strips or other forms than those shown and of other material than that mentioned may be employed if desired. It will also be apparent that if the ventilator is made of colored glass, or other suitable material, it will function as a sunshade or visor as well.

The ventilator, being positioned at the top of the window, permits the window glass to be lowered to provide a belt or area for unobstructed vision between the top of the window glass and the lower portion of the ventilator. The ventilator is positioned exteriorly of the window glass and preferably slightly inclined downwardly and outwardly, whereby it acts as an eave or a water shed and prevents entrance of rain, snow, dust and the like when the window is lowered.

In use my ventilator tends to draw the air from the vehicle which permits convenient ventilation thereof when a front window of the vehicle is opened. With the windshield closed, the moving car deflects foreign particles to a point rearwardly of the open front window through which air is admitted. The air is expelled through the ventilator equipped rear window, which outgoing air prevents the entrance of such foreign matters at this point. It will be seen that a very satisfactory ventilation of the vehicle can be effected by the use of my ventilator.

Although I have shown and described various modifications of my invention for purposes of illustration, it will be understood, as previously mentioned, that the invention may be embodied in still other forms and I do not, therefore, wish to be restricted to the particular modifications shown, except where limitations thereto appear in the appended claims.

What I claim is:—

1. The combination with a vehicle having a window adapted to be moved to open position, of a ventilator adapted to overlie the opening thus made, said ventilator being so positioned as to admit of the free normal opening and closing of said window means supporting said ventilator permitting of partial movement thereof, said means comprising brackets coacting with the ends of said ventilator, and means at the lower corners of said ventilator for protecting the same from contact with said supporting means.

2. In a device of the class described, a ventilator having protecting clips on the lower corners thereof, a pair of end brackets therefor admitting of adjustment of said ventilator, said brackets having portions in engagement with said clips for holding the ventilator in adjusted position.

3. In a device of the class described, a ventilator, a pair of end brackets therefor admitting of adjustment of said ventilator, resilient frictional means integral with said brackets for holding said ventilator in adjusted position, and means protecting the lower corners of said ventilator from contact with said frictional means.

4. In a device of the class described, a ventilator, a pair of end brackets therefor admitting of adjustment of said ventilator, resilient frictional means in engagement with portions of said ventilator for holding the same in adjusted position and means protecting said portions of said ventilator, said last mentioned means comprising clips secured to the lower corners of said ventilator.

5. The combination with a vehicle window having a frame, of a glass ventilator mounted adjacent the top thereof, brackets enclosing the ends of said ventilator and admitting of the adjustment thereof, and means carried by said ventilator for effecting a seal at the ends thereof with said brackets and at the top with the frame of said window.

6. The combination with a vehicle having a window adapted to be opened at the top, of a pair of brackets positioned adjacent the top of said window, said brackets each having a pair of flanges, a ventilator extending across said window and having each end adjustably positioned between the respective flanges of said bracket and being supported thereby, protecting means interposed between the lower edges of said ventilator and said brackets, and resilient channel members on the ends and top edge of said ventilator for preventing ingress of rain or the like between said ends and bracket and between the top of said ventilator and the upper portion of said window, said ventilator being open at the bottom for admission of air and permitting said window to open and close normally.

7. The combination with a vehicle having a window adapted to be opened at the top, of a pair of brackets secured in said window opening adjacent the top thereof, each of said brackets being provided with a pair of flanges forming a recess for the reception of the ends of a ventilator, a ventilator adjustably supported in said recess, said ventilator being provided with resilient weather stripping on the ends thereof, and a resilient weather strip extending along the top of said ventilator having a longitudinal rib on its upper side contacting with the upper portion of the frame of said window to prevent ingress of rain or the like over the top of said ventilator.

8. The combination with a vehicle having a window adapted to be opened at the top, of a pair of brackets positioned adjacent the top of said window on the outer side thereof, each of said brackets being provided with an inner and an outer flange, a glass ventilator extending across said window and having its ends positioned between the flanges of the respective brackets, sealing means on the ends and top edge of said ventilator for preventing ingress of foreign matter therearound, said brackets having means for adjustably supporting said ventilator, and means interposed between said supporting portions on said brackets and the lower corners of said ventilator for protecting the latter, said ventilator being open at the bottom and permitting said window to open and close normally.

9. The combination with an automobile having a window adapted to be opened at the top, of a pair of brackets positioned adjacent the top of said window, said brackets each comprising a pair of spaced apart flanges, and a lower portion adapted to adjustably support a ventilator, a ventilator supported by said portion and having its ends disposed between the flanges of the respective brackets, and resilient channel members engaging the ends and top edge of said ventilator for preventing entrance of foreign matters between said ends and brackets and between the top of said ventilator and the upper portion of the frame of said window, said ventilator permitting said window to open and close normally.

10. The combination with an automobile having a door, of a window therein, said window having a glass adapted to be lowered to provide an opening at the top of said window, a glass ventilator, and means for resiliently and adjustably securing the same at the top of the window opening exteriorly of the window glass, said means comprising supporting brackets secured to said automobile door and resilient members interposed between the ends of said ventilator and brackets and between the top of the ventilator and a portion of the door above said window, said resilient members serving to permit a slight relative movement of said glass and door when the latter is stressed in use.

11. A ventilator for the side door of a closed body automobile, having a vertically adjustable glass panel to provide a variable opening in the upper part of said door, comprising a pair of sheet metal brackets each having openings therein, fastening means passing therethrough and securing said brackets in parallel relation near the top of said door on opposite sides of said opening, each bracket having the outer edge bent toward the other bracket to form an inclined flange sloping downwardly and away from the top of said opening, the bottom of each flange extending inwardly at right angles and upwardly somewhat to form a seat, and a strip of ventilator glass extending from one of said brackets to the other with each of its lower opposite corners supported by one of said seats, channel members of yielding material fitting over the ends of said glass between the same and said brackets and fitting over the top edge thereof in contact with the upper wall of said opening to cushion the glass and exclude moisture, the portions of said yielding channel members which embrace the opposite ends of said glass near the top thereof being confined between said flanges and an additional portion of each bracket projecting therefrom, the upper edge of said glass panel and the lower edge of said ventilator glass being free of attachments except at the sides thereof, whereby vision past said edges is unimpeded and whereby rain descending at an angle against said glass panel will not obscure a limited area immediately below said strip of glass.

In testimony whereof, I have subscribed my name.

BURTT J. HUBBARD.